C. C. KEESLER AND F. A. CLOCK.
COUPLING FOR WAGON TRAILERS.
APPLICATION FILED JAN. 9, 1918.
1,319,224.
Patented Oct. 21, 1919.
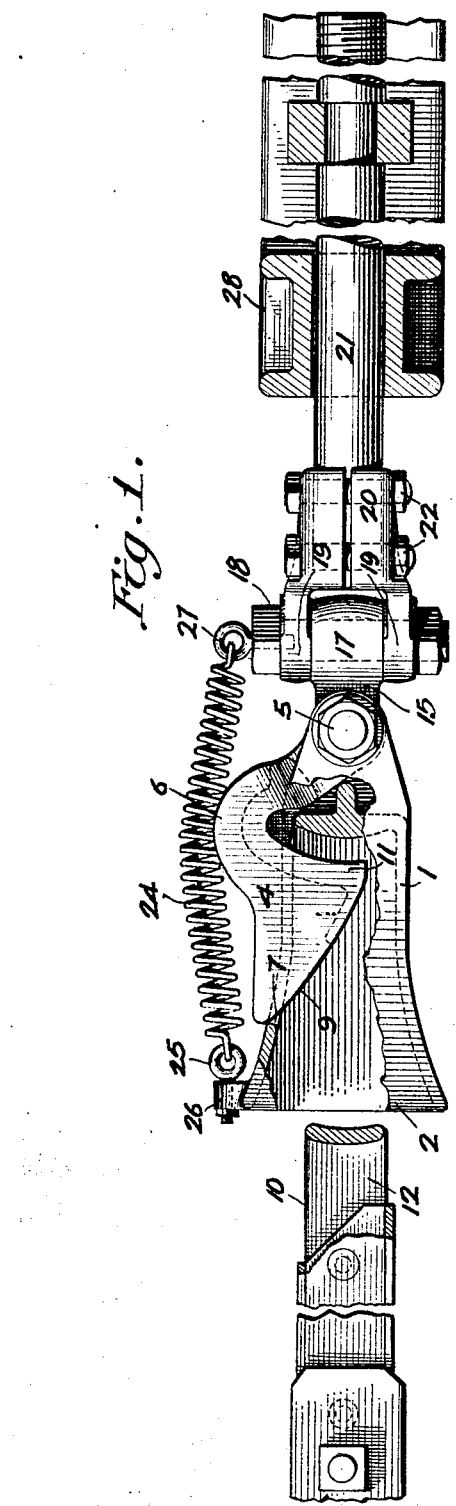
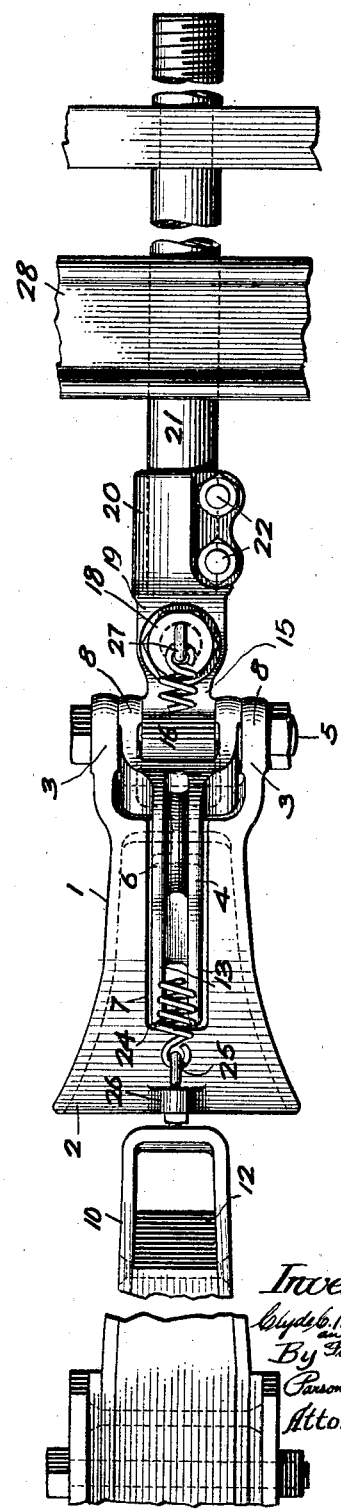
Inventor:
Clyde C. Keesler
and
By Fra A. Clock.
Parsons & Bodell
Attorneys.

UNITED STATES PATENT OFFICE.

CLYDE C. KEESLER AND FRED A. CLOCK, OF CANASTOTA, NEW YORK, ASSIGNORS TO WATSON WAGON COMPANY, OF CANASTOTA, NEW YORK, A CORPORATION OF NEW YORK.

COUPLING FOR WAGON-TRAILERS.

1,319,224.   Specification of Letters Patent.   Patented Oct. 21, 1919.

Application filed January 9, 1918. Serial No. 210,993.

*To all whom it may concern:*

Be it known that we, CLYDE C. KEESLER and FRED A. CLOCK, citizens of the United States, and residents of Canastota, in the county of Madison and State of New York, have invented a certain new and useful Coupling for Wagon-Trailers, of which the following is a specification.

This invention has for its object an automatic coupling means particularly applicable for coupling trailers to motor trucks, tractors or other trailers which coupling means is particularly simple in construction, economical in manufacture and highly efficient and durable in use.

The invention consists in the combinations and constructions hereinafter set forth and claimed.

In describing this invention, reference is had to the accompanying drawings in which like characters designate corresponding parts in all the views.

Figure 1 is a side elevation, partly in section, of a preferable embodiment of our coupling, the contiguous part of the tractor frame and the tongue or pole to be coupled thereto, being also shown.

Fig. 2 is a plan view of parts seen in Fig. 1.

This coupling comprises a socket, a locking member movable in the socket, the socket being connected by a universal joint to a draw bar, or other part, and spring means tending to hold the socket from movement about one of its axes out of a horizontal plane and also to press the locking member into its operative position.

1 designates the socket which is here shown as in the form of an elongated bell having a flaring mouth 2, the socket having spaced apart yoke arms 3 at its rear end which are formed with alined bearings.

4 is the locking member which in this embodiment of my invention, is in the form of a latch pivoted on the shaft 5 mounted in the bearings of the yoke arms 3, and forming one of the axes of the universal joints connecting the socket 1 and the draw bar. The latch 4 has a rounding or hump-shaped portion 6 extending through a slot 7 in the top of the socket member 1 and is provided with spaced apart bearings 8 at its rear end which are mounted upon the shaft 5 adjacent the yoke arms 3 and socket 1.

The advance end of the latch 4 is provided with a cam surface 9 for coacting with the advance end of a coupling element or tongue 10 of a trailer when the tongue is moving into the socket, the cam face 9 causing the latch to be pushed upwardly until the tongue has passed under the hook-shaped part 11 of the latch so that said hook-shaped part may enter the slot 12 in the advance end of the tongue 10.

The cam surfaces are formed upon the edges of spaced apart webs 13 at the advance end of the latch 4.

15 is the knuckle of the universal joint, said knuckle having bearing openings 16 and 17 arranged at an angle to each other, the bearing 16 being mounted on the shaft 5 between the bearings 8 of the latch 4 and the bearing 17 being pivoted by a vertical pivot 18 to the yoke 19 of the head 20 of the draw bar 21.

The head 20 is provided with a split hub in which the end of the draw bar extends, the sections of the hub being drawn together by clamping members, as bolts 22, extending through jaws on the sections of the hub 20 and also through notches in the draw bar.

24 is a spring for holding the socket member 1 from movement out of a horizontal plane and also holding the latch 4 in its operative position, this spring being here shown as a tension spring connected at one end to an eye 25 carried by a lug 26 at the front end of the socket 1 and at its other end to an eye 27 extending into the head of the pivot or bolt 18 of the universal joint, the intermediate part of this spring bearing against the seat 14 of the latch.

In use, the socket 2 and latch carried thereby can swing laterally and vertically to be coupled to a pole 10 extending at any angle out of the horizontal or vertical and when not in use is held from falling from horizontal position.

To couple the device, the draw bar 12 is moved into the socket 2 and latched into engagement with the locking member 4. To uncouple, the tractor is backed up sufficiently to relieve the binding of the draw bar 12 on the locking member 4 and the locking member moved upwardly by means of a prying bar inserted between the locking member and the top of the socket 2 at any point.

These features are particularly advantageous as it is oftentimes necessary to couple onto a trailer in almost inaccessible positions especially in excavation and construction work.

What we claim is:

1. A coupling comprising a hinged socket, a pivoted locking member movable in the socket and mounted upon the axis thereof, substantially as and for the purpose specified.

2. A coupling comprising a pivoted socket, a pivoted locking member movable into the socket, a spring normally resisting pivotal movement of the socket, the spring acting upon the locking member to press the same into operative position, substantially as and for the purpose described.

3. A coupling comprising a hinged socket, a locking member movable in the socket and having a portion projecting outside of the same, a spring extending lengthwise of the socket and connected at one end to the front end of the socket and at its other end to the fixed point external to the socket, the intermediate part of the spring bearing upon the locking member and tending to press the same into operative position, substantially as and for the purpose set forth.

4. A coupling comprising a socket having alined bearings at one end, a shaft mounted in the bearings, a locking member extending into the socket and having a bearing mounted on the shaft, a knuckle having a bearing mounted on the shaft and a draw bar connection pivoted to the knuckle on the axis extending crosswise of said shaft, substantially as and for the purpose described.

5. A coupling comprising a pivoted socket, a pivoted locking member mounted on the the axis of the socket, said member extending in the socket and having a cam face at its advance end near the entrance of the socket, substantially as and for the purpose set forth.

6. A coupling comprising a socket having alined bearings at one end, a shaft mounted in the bearings, a locking member extending into the socket and having a bearing mounted on the shaft, a knuckle having a bearing mounted on the shaft, a draw bar connection pivoted to the knuckle on the axis extending crosswise of said shaft, and a spring connected to the socket to support the same from movement about the shaft, the spring also acting on the locking member to press the same into locking position, substantially as and for the purpose specified.

In testimony whereof, we have hereunto signed our names, at Canastota, in the county of Madison and State of New York, this 11th day of Dec., 1917.

CLYDE C. KEESLER.
FRED A. CLOCK.

Copies of this patent may be obtained for five cents each, by addressing the "Commissioner of Patents, Washington, D. C."